(12) United States Patent
Liu et al.

(10) Patent No.: US 7,617,194 B2
(45) Date of Patent: Nov. 10, 2009

(54) SUPERVISED RANKING OF VERTICES OF A DIRECTED GRAPH

(75) Inventors: Tie-Yan Liu, Beijing (CN); Tao Qin, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 11/618,380

(22) Filed: Dec. 29, 2006

(65) Prior Publication Data

US 2008/0162453 A1 Jul. 3, 2008

(51) Int. Cl.
*G06F 17/30* (2006.01)

(52) U.S. Cl. .......................................... 707/3

(58) Field of Classification Search ........................ None
See application file for complete search history.

(56) References Cited

U.S. PATENT DOCUMENTS

| | | | | |
|---|---|---|---|---|
| 6,285,999 | B1 * | 9/2001 | Page | 707/5 |
| 6,654,742 | B1 | 11/2003 | Kobayashi et al. | |
| 6,839,682 | B1 * | 1/2005 | Blume et al. | 705/10 |
| 7,024,404 | B1 | 4/2006 | Gerasoulis et al. | |
| 7,026,029 | B2 | 4/2006 | Kamvar et al. | |
| 7,089,252 | B2 | 8/2006 | Tomlin et al. | |
| 7,343,374 | B2 * | 3/2008 | Berkhin | 707/5 |
| 7,464,075 | B2 * | 12/2008 | McSherry et al. | 707/3 |
| 2004/0024752 | A1 | 2/2004 | Manber et al. | |
| 2004/0111412 | A1 | 6/2004 | Broder | |
| 2005/0071465 | A1 | 3/2005 | Zeng et al. | |
| 2005/0216533 | A1 * | 9/2005 | Berkhin | 707/204 |
| 2005/0256860 | A1 | 11/2005 | Eiron et al. | |
| 2006/0020607 | A1 * | 1/2006 | Patterson | 707/100 |
| 2006/0059119 | A1 | 3/2006 | Canright et al. | |
| 2006/0074910 | A1 * | 4/2006 | Yun et al. | 707/7 |
| 2006/0248059 | A1 | 11/2006 | Chi et al. | |
| 2008/0010281 | A1 * | 1/2008 | Berkhin et al. | 707/7 |
| 2008/0114750 | A1 * | 5/2008 | Saxena et al. | 707/5 |

OTHER PUBLICATIONS

Adamic, Leda A. and Bernardo A. Huberman, "Power-Law Distribution of the World Wide Web," Technical Comment, Science, vol. 287, Mar. 24, 2000, p. 2115a.

Arasu, Arvind et al., "PageRank Computation and the Structure of the Web: Experiments and Algorithms," 5 pages.

Boyd, Stephen et al., "Chapter 11—Interior-point methods," Convex Optimization, © Cambridge University Press 2004, pp. 561-622.

(Continued)

*Primary Examiner*—Charles Rones
*Assistant Examiner*—Kurt Mueller
(74) *Attorney, Agent, or Firm*—Perkins Coie LLP

(57) ABSTRACT

A method and system for ranking importance of vertices of a directed graph based on links between the vertices and some prior knowledge of importance of the vertices is provided. A ranking system inputs an indication of the vertices along with an indication of the links between the vertices as the directed graph. The ranking system generates a transition-probability matrix that represents the probability of transitioning from vertex to vertex. The ranking system then generates a ranking of the vertices based on the links between the vertices represented by the stationary distribution of the transition-probability matrix that is minimally perturbed to satisfy the prior knowledge, which may be a partial ranking of the vertices.

18 Claims, 3 Drawing Sheets

OTHER PUBLICATIONS

Brinkmeier, Michael, "PageRank Revisited," ACM Transactions on Internet Technology, vol. 6, No. 3, Aug. 2006, © 2006 ACM, pp. 282-301.

Gyongyi, Zoltan, Hector Garcia-Molina and Jan Pedersen, "Combating Web Spam with TrustRank," Proceedings of the 30th VLDB Conference, Toronto, Canada, 2004, pp. 576-587.

Kamvar, Sepandar D. et al., "Exploiting the Block Structure of the Web for Computing PageRank," 2003, 13 pages.

Meila, Marina and Jianbo Shi, "Learning Segmentation by Random Walks," NIPS, 2001, 7 pages.

Ng, Andrew Y., Alice X. Zheng and Michael I. Jordan, "Link Analysis, Eigenvectors and Stability," IJCAI, 2001, 8 pages.

Page, L. et al., "The PageRank Citation Ranking: Bringing Order to the Web," Jan. 29, 1998, Stanford University Technical Report, pp. 1-17.

Qin, Tao, Tie-Yan Liu and Wei-Ying Ma, "Supervised Ranking for Directed Graphs," 21 pages.

Sobek, Markus, "Additional Factors Influencing PageRank," eFactory, © 2002/2003 eFactory GmbH & Co. KG Internet-Agentur, 7 pages, http://pr.efactory.de/e-further-factors.shtml [last accessed Nov. 16, 2006].

Zhou, Dengyong et al., "Ranking on Data Manifolds," 2004, 8 pages.

Peer Review for "Supervised Ranking for Directed Graphs," authors Qin Liu et al.

* cited by examiner

SUPERVISED RANKING OF VERTICES OF A DIRECTED GRAPH

BACKGROUND

Many search engine services, such as GOOGLE and OVERTURE, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Three well-known techniques for page ranking are PAGERANK, HITS ("Hyperlink-Induced Topic Search"), and DirectHIT. PAGERANK is based on the principle that web pages will have links to (i.e., "out links") important web pages. Thus, the importance of a web page is based on the number and importance of other web pages that link to that web page (i.e., "in links"). Web pages and their links can be represented as a web graph. A web graph represents web sites as vertices of the graph and links between web pages of the web sites as edges between the vertices. The edges are directed to differentiate in and out links. A web graph can be represented as an adjacency matrix $A_i$ where $A_{ij}$ represents the number of out links from web page i to web page j. The importance score $w_j$ for web page j can be represented by the following equation:

$$w_j = \sum_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PAGERANK, which calculates the importance of web pages independently from the query, HITS calculates importance based on the web pages of the result and web pages that are related to the web pages of the result by following in links and out links. HITS submits a query to a search engine service and uses the web pages of the result as the initial set of web pages. HITS adds to the set those web pages that are the destinations of in links and those web pages that are the sources of out links of the web pages of the result. HITS then calculates the authority and hub score of each web page using an iterative algorithm. The authority and hub scores can be represented by the following equations:

$$a(p) = \sum_{q \to p} h(q)$$

and $$h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of click-through data, $b_{ij}$ of the adjacency matrix can be increased whenever a user travels from web page i to web page j.

Although these techniques for ranking web pages based on analysis of links can be very useful, these techniques assume that the underlying data (e.g., web pages and their links) upon which importance is based is both accurate and reliable. Unfortunately, the underlying data can have inaccuracies and the links may not be a reliable representation of importance, resulting in reduced reliability of the determination of importance. Web pages and links may be missing from the underlying data for several reasons, making the data inaccurate. For example, when crawling web sites, some links may be missed due to an HTML parsing error or expiration of a URL. If the importance of scholarly papers is being determined, some citations may be lost due to different formats of abbreviations in the references. The underlying data may also have links that are not reliable representations of importance. For example, the links may include many "spam" links. "Spamming" in general refers to a deliberate action taken to unjustifiably increase the popularity or importance of a web page or web site. In the case of link spamming, a spammer can manipulate links to unjustifiably increase the importance of a web page. For example, a spammer may increase a web page's hub score by adding out links to the spammer's web page. A common technique for adding out links is to create a copy of an existing link directory to quickly create a very large out link structure. As another example, a spammer may provide a web page of useful information with hidden links to spam web pages. When many web pages point to the useful information, the importance of the spam web pages is indirectly increased. As another example, many web sites, such as blogs and web directories, allow visitors to post links. Spammers can post links to their spam web pages to directly or indirectly increase the importance of the spam web pages. As another example, a group of spammers may set up a link exchange mechanism in which their web sites point to each other to increase the importance of the web pages of the spammers's web sites. Spam links may also be present in scholarly papers. For example, an author may prefer to include a citation to a previous paper of the author even though another paper may be more relevant and more authoritative.

SUMMARY

A method and system for ranking importance of vertices of a directed graph based on links between the vertices and some prior knowledge of importance of the vertices is provided. A ranking system inputs an indication of the vertices along with an indication of the links between the vertices as the directed graph. The ranking system generates a transition-probability matrix that represents the probability of transitioning from vertex to vertex. The ranking system then generates a ranking of the vertices based on the links between the vertices represented by the stationary distribution of the transition-probability matrix that is minimally perturbed to satisfy the prior knowledge, which may be a partial ranking of the vertices. This ranking is supervised in that the ranking of importance is influenced by the prior knowledge. The ranking system can be used to generate a supervised ranking for any data that can be represented as a directed graph with transition probabilities associated with transitioning from vertex to vertex along the links, such as web pages and their hyperlinks and scholarly articles and their citations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
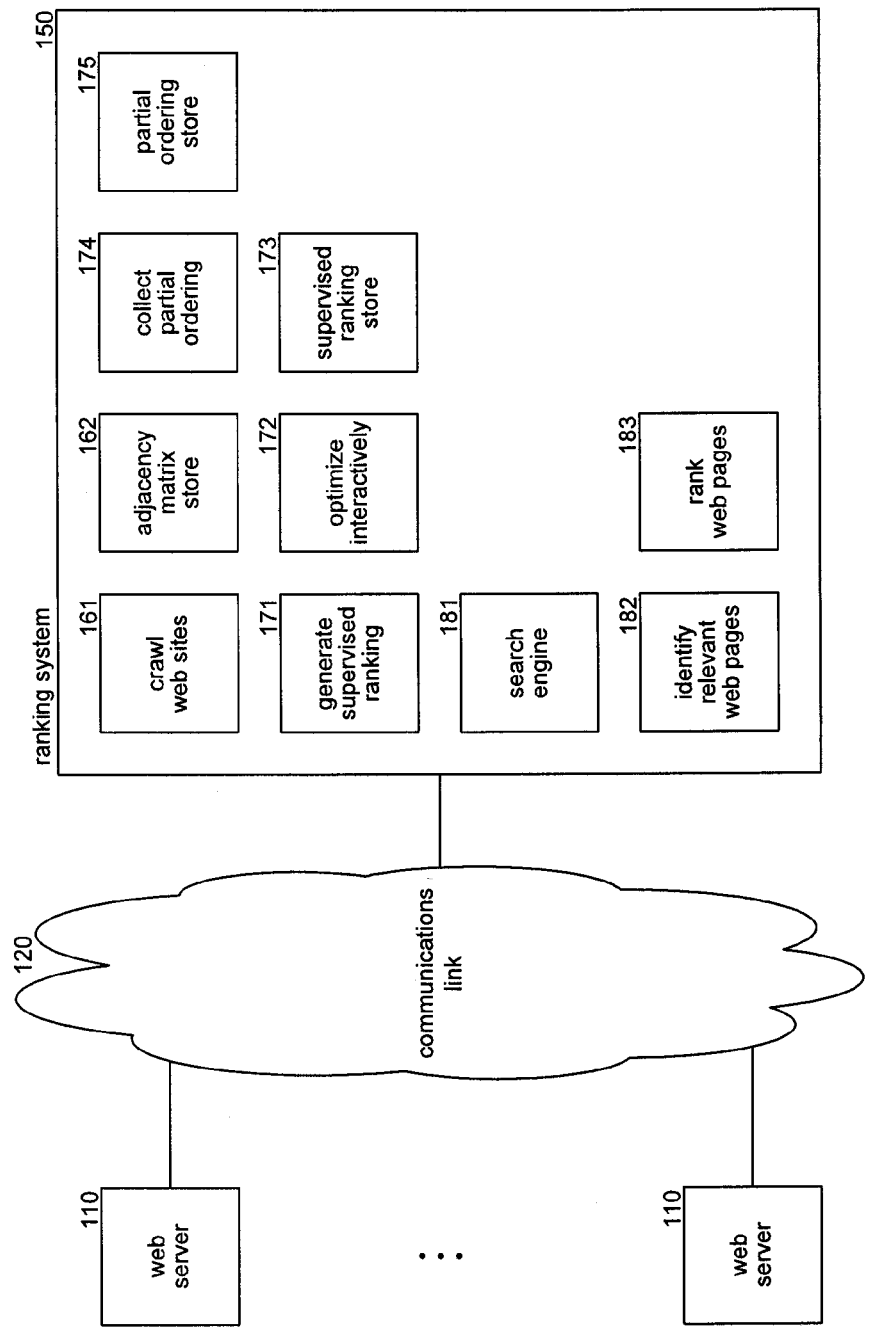
FIG. 1 is a block diagram that illustrates components of the ranking system in one embodiment.

A method and system for ranking importance of documents based on links between the documents and some prior knowledge of importance of the documents is provided. In one embodiment, a ranking system inputs an indication of the documents along with an indication of the links between the documents. For example, if the documents are web pages, then the ranking system may represent the web pages and the links between the web pages using an adjacency matrix. The ranking system also inputs some prior knowledge of the ranking of the documents such as a partial ordering of some documents. For example, the ranking system may input from a person an indication of the relative ranking of pairs of web pages. The ranking system may also input other prior knowledge such as the popularity of a web page derived from analysis of click-through data. The popularity of some web pages may indicate a relative ordering of their rankings. The ranking system then generates a ranking of the documents based on the links between the documents while attempting to satisfy the partial ranking constraints of the prior knowledge. This ranking is supervised in that the ranking of importance is influenced by the partial ranking. The ranking system uses the additional partial ranking, which is not susceptible to the same inaccuracies and unreliability of the underlying data. Thus, the ranking system can generate a more accurate and reliable ranking of importance than techniques that rely solely on documents and their links. Moreover, the ranking system can be used to generate a supervised ranking for any data that can be represented as a directed graph with transition probabilities associated with transitioning from vertex to vertex along the links.

In one embodiment, when importance is based on a page rank-type algorithm, the ranking system attempts to perturb (or adjust) the transition-probability matrix so that the stationary distribution, which represents the ranking of the vertices, satisfies the partial rankings. In doing so, the ranking system attempts to minimize the perturbation to the transition-probability matrix so that the ranking reflects, to the extent possible, the influence of the unperturbed transition-probability matrix. Unfortunately, the goal of minimizing the perturbation while calculating the stationary distribution of the transition-probability matrix (i.e., the eigenvector) has a feasible domain that is not convex. The feasible domain is not convex because the minimization is constrained by the stationary distribution that is defined in terms of the perturbation that is to be minimized. The finding of a solution to a problem with a non-convex feasible domain is very computationally complex. To avoid this computational complexity, the ranking system reformulates the optimization problem so that its feasible domain is convex. The ranking system removes this constraint and adds the constraining equation to the objective function that is to be minimized. As described below in detail, the ranking system then uses an interactive optimization algorithm to iteratively and interactively solve the reformulated objective function, which is non-convex. The interactive optimization algorithm iteratively fixes the perturbation and calculates the eigenvector and then fixes the eigenvector and calculates the perturbation until the perturbation and the eigenvector converge on a solution, with the principal eigenvector representing the ranking of the vertices.

In one embodiment, the ranking system may collect prior knowledge of the ranking or importance of documents from various sources. For example, the ranking system can input expert opinions as to which scholarly papers have more impact in a specific domain than others. The ranking system may also use the number of visitors of web pages as an indication of their ranking or importance. The ranking system may represent this prior knowledge by partial order constraints. For example, if vertex 1 is known to be more important than vertex 2, and vertex 3 is known to be more important than vertex 4, the ranking system may represent the partial order constraints represented by the following equations:

$$\begin{bmatrix} 1 & 0 & 0 & 0 \\ 0 & 0 & 1 & 0 \end{bmatrix} \pi > \begin{bmatrix} 0 & 1 & 0 & 0 \\ 0 & 0 & 0 & 1 \end{bmatrix} \pi \quad (1a)$$

or

-continued $$A\pi > B\pi \quad (1b)$$

where $$A = \begin{bmatrix} 1 & 0 & 0 & 0 \\ 0 & 0 & 1 & 0 \end{bmatrix}$$

and $$B = \begin{bmatrix} 0 & 1 & 0 & 0 \\ 0 & 0 & 0 & 1 \end{bmatrix}.$$

Given these constraints, the ranking system perturbs the transition-probability matrix according to the following equation:

$$P_1 = P - E \quad (2)$$

where $P_1$ is the perturbed transition-probability matrix, P is the original transition-probability matrix derived from the adjacency matrix, and E is a perturbation matrix. The ranking system perturbs the transition-probability matrix so that the stationary distribution of the new Markov chain will be consistent with the constraints as much as possible. Many different perturbation matrices can be used to satisfy the partial order constraints. If the transition-probability matrix is perturbed too much, most of the information on importance derived from the directed graph will be lost. Although the information on importance may be to some extent inaccurate and unreliable, much of the information is accurate and reliable. To prevent the transition-probability matrix from being perturbed too much, the ranking system formulates the supervised ranking as an optimization problem in which the perturbation is minimized subject to those partial order constraints as represented by the following equations:

$$\min \|E\|_F^2 \quad (3)$$

$$s.t.\ (P-E)e=e \quad (3a)$$

$$(P-E) \geq 0 \quad (3b)$$

$$\pi^T = \pi^T(P-E) \quad (3c)$$

$$e^T\pi = 1 \quad (3d)$$

$$\pi \geq 0 \quad (3e)$$

$$A\pi > B\pi \quad (3f)$$

where Equation 3 represents the objective function (e.g., the minimization of the perturbation matrix), Equations 3a-3f represent the constraints e represents a vector of 1's, $\pi$ represents the eigenvector, $(P-E) \geq 0$ means that each element of the matrix P−E is non-negative, and $\|E\|_F$ represents the Frobenius norm of the matrix E. Any other matrix norm may also be used although the ranking system may use the Frobenius norm for its computation simplicity. Equations 3a and 3b ensure that the perturbed transition-probability matrix is still a row-stochastic transition-probability matrix. Equations 3c, 3d, and 3e ensure that $\pi$ is the stationary distribution of the perturbed Markov chain. Equation 3f is the supervision which is given according to the prior knowledge.

The constraints of Equations 3a, 3b, 3d, 3e, and 3f are affine functions of $\pi$ or E. However, the constraint of Equation 3c contains interweaved terms of $\pi$ and E, which makes the feasible domain non-convex. Because of the computational complexity of solving optimization problems with feasible domains that are non-convex, the ranking system moves the constraint of Equation 3c to the objective function and reformulates the optimization problem as represented by the following equations:

$$\min \|E\|_F^2 + c\pi^T(I+E-P)(I+E-P)^T\pi \quad (4)$$

$$s.t.\ (P-E)e=e \quad (4a)$$

$$(P-E) \geq 0 \quad (4b)$$

$$e^T\pi = 1 \quad (4c)$$

$$\pi \geq 0 \quad (4d)$$

$$A\pi > B\pi \quad (4e)$$

where c in Equation 4 is a trade-off parameter (e.g., 100). The reformulated problem has a feasible domain that is convex.

Although the feasible domain of the problem of Equation 4 is convex, the objective function is not. To solve this problem, the ranking system decomposes this problem into two convex sub-problems. In each sub-problem, the ranking system fixes one parameter ($\pi$ or E) and finds the optimal value of the other. By iteratively solving these sub-problems one after the other using an interactive optimization algorithm, the ranking system can get a close-to-optimal solution of the original problem. The ranking system represents the first sub-problem by the following equation:

$$\pi(E) = \arg\min_\pi \|E\|_F^2 + c\pi^T(I+E-P)(I+E-P)^T\pi \quad (5)$$

$$s.t.\ e^T=1 \quad (5a)$$

$$\pi>0 \quad (5b)$$

$$A\pi > B\pi \quad (5c)$$

where the perturbation matrix E is fixed and $\pi$ is optimized. This sub-problem is a linearly constrained quadratic optimization problem, which can be solved very efficiently. Since both the feasible domain and the objective function are convex, this problem has a global minimum $\pi(E)$.

The ranking system represents the second sub-problem by the following equations:

$$E(\pi) = \arg\min_E \|E\|_F^2 + c\pi^T(I+E-P)(I+E-P)^T\pi \quad (6)$$

$$s.t.\ (P-E)e=e \quad (6a)$$

$$(P-E)>0 \quad (6b)$$

where the stationary distribution $\pi$ is fixed and the perturbation matrix E is optimized. This sub-problem is also a linearly constrained quadratic convex optimization problem, for which the global minimum $E(\pi)$ can be solved efficiently. The interactive optimization algorithm is represented by the following pseudo code:

```
Given E₀
repeat
    find the global optimal πᵢ by fixing E = Eᵢ₋₁
```

-continued find the global optimal $E_i$ by fixing $\pi = \pi_i$
until $\pi_i$ and $E_i$ converge
End Well-known techniques exist for finding the global optimal such as variations of Newton's method. These variations include interior-point methods as described in Boyd and Vandenberghe, *Convex Optimization*, Cambridge University Press, 2004, Chap. 11. Interior-point methods can achieve specified optimization accuracy with a computational complexity that does not exceed a polynomial of the problem dimensions. The space complexity, however, for the second sub-problem is $O(n^2)$. Since there are millions of web pages n, the space complexity is very large. In one embodiment, the ranking system takes advantage of the sparseness of the adjacency matrix representing the directed graph to reduce the space complexity. For example, regardless of the number of web pages, the average is only about ten out links per page. Similarly, regardless of the number of papers in a domain, the average is in the tens of citations per paper. Thus, although there are approximately $O(n^2)$ possible vertex pairs, there are actually only $O(n)$ edges. To reduce the space complexity, the ranking system only perturbs the non-constant elements in P (which correspond to those actual edges between vertices). Although this simplification may lead to a drop in effectiveness, it may be a reasonable tradeoff between efficiency and effectiveness.

FIG. 1 is a block diagram that illustrates components of the ranking system in one embodiment. The ranking system 150 is connected via communications link 120 to various web servers 110. The web servers serve the web pages of various web sites. The ranking system may include a crawl web sites component 161 and an adjacency matrix store 162. The crawl web sites component crawls the various web sites provided by the web servers to identify web pages and their links. The crawl web sites component stores a representation of the corresponding web graph in the adjacency matrix store. The ranking system may also include a search engine component 181, an identify relevant web pages component 182, and a rank web pages component 183. The search engine component receives queries for web pages and invokes the identify relevant web pages component to identify the web pages that are relevant to a query. The search engine component then invokes the rank web pages component to generate an ordering for the web pages to be returned as a result of the query. The rank web pages component may factor in the relevance of the web page to the query, the importance of a web page as indicated by the supervised ranking of web pages, the popularity of the web pages, and so on. The ranking system may also include a generate supervised ranking component 171, an optimize interactively component 172, a supervised ranking store 173, a collect partial ordering component 174, and a partial ordering store 175. The collect partial ordering component may collect a partial ordering of the web pages from a user or some other source and store the partial ordering in the partial ordering store. The generate supervised ranking component generates a ranking for the web pages using the adjacency matrix store and the partial ordering store. The generate supervised ranking component invokes the optimize interactively component to generate the ranking and stores the ranking of each web page in the supervised ranking store.

The computing device on which the ranking system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the ranking system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the ranking system may be implemented in various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, a separate computing system may crawl the web and generate the web graphs. Also, a separate computing system may provide search engine capabilities. Thus, the crawling and search engine functions can be separate from the supervised ranking functions. For example, one company may generate a supervised ranking component and distribute it to other companies for use in various applications, such as ranking web pages, scholarly articles, and so on.

Figure 2:
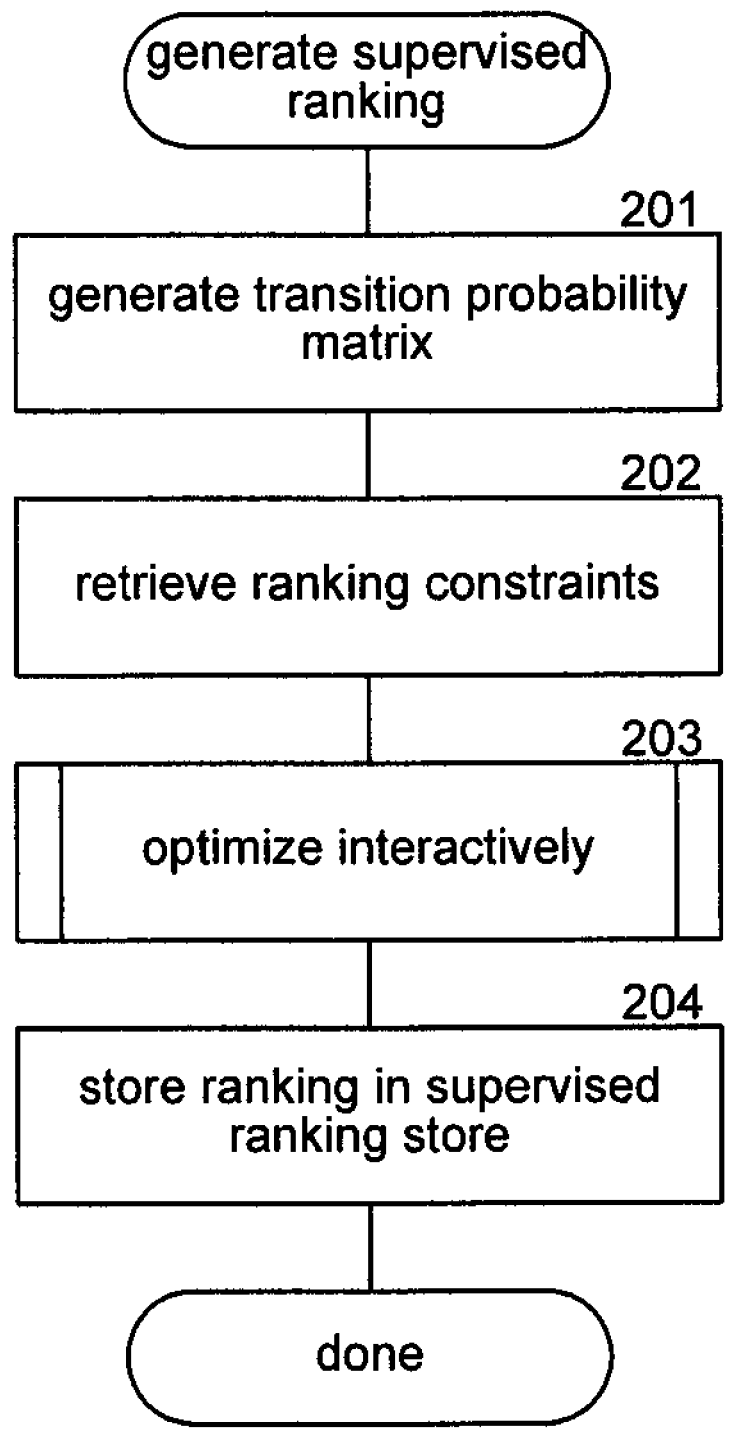
FIG. 2 is a flow diagram that illustrates the processing of the generate supervised ranking component of the ranking system in one embodiment.

FIG. 2 is a flow diagram that illustrates the processing of the generate supervised ranking component of the ranking system in one embodiment. The component is provided with a directed graph represented by a transition-probability matrix and with a partial ranking of the vertices of the directed graph. The component then generates a ranking of the vertices while attempting to satisfy the constraints of the partial ranking. In block 201, the component generates a transition-probability matrix from the adjacency matrix. The component may initialize the probability of each non-zero element of each row of the adjacency matrix to 1/n, where n is the number of non-zero elements in the row. In block 202, the component retrieves the partial ranking constraints. In block 203, the component invokes the optimize interactively component to rank the vertices of the web graph. In block 204, the component stores the ranking in the supervised ranking store and then completes.

Figure 3:
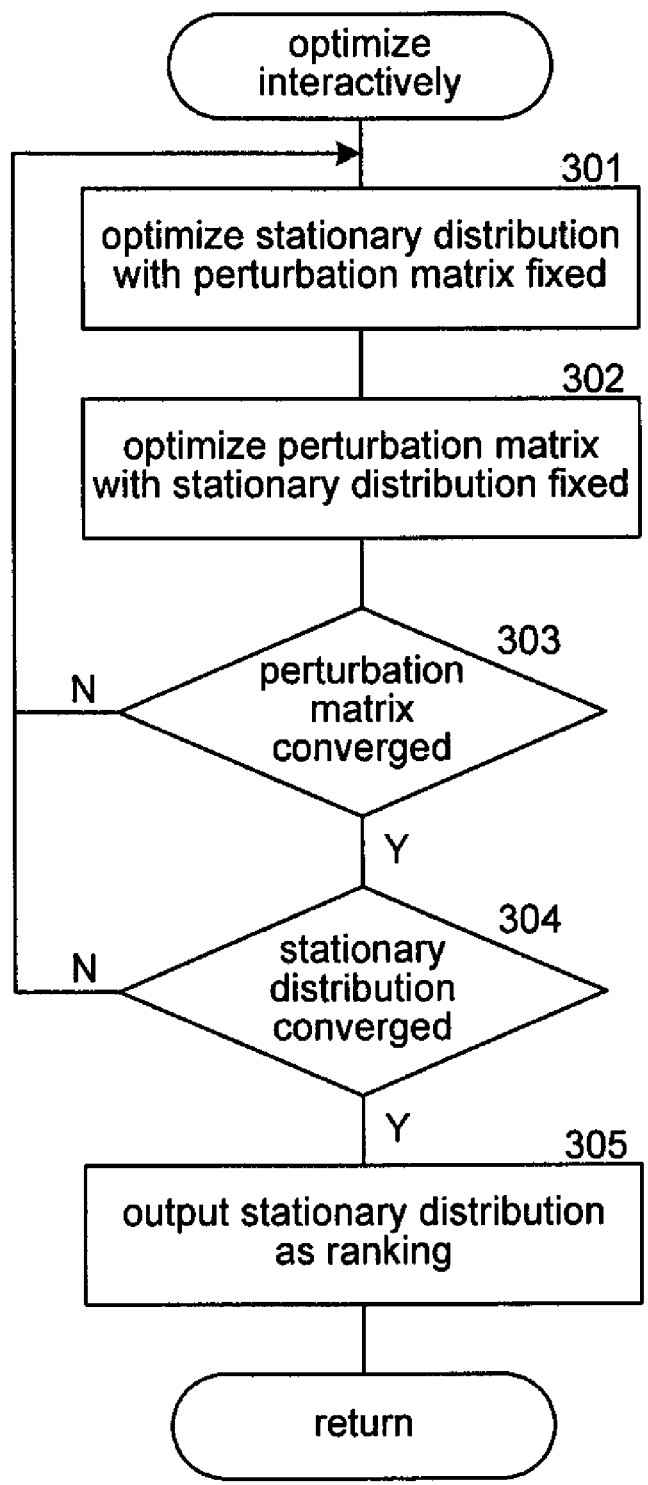
FIG. 3 is a flow diagram that illustrates the processing of the optimize interactively component of the ranking system in one embodiment.

FIG. 3 is a flow diagram that illustrates the processing of the optimize interactively component of the ranking system in one embodiment. The component is passed a transition-probability matrix and constraints. The component iteratively solves the first and second sub-problems and outputs the stationary distribution as the ranking of the vertices. In block 301, the component optimizes the stationary distribution with the perturbation matrix fixed according to the objective function of Equation 4. In block 302, the component optimizes the perturbation matrix with the stationary distribution according to the objective function of Equation 5. In decision block 303, if the perturbation matrix has converged, then the component continues at block 304, else the component loops to block 301 to perform the next iteration. In decision block 304, if the stationary distribution has converged, then the component continues at block 305, else the component loops to block 301 to start the next iteration. In block 305, since the perturbation matrix and stationary distribution have converged on a solution, the component outputs the stationary distribution as a ranking of the vertices and then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The ranking system may be adapted to provide supervised ranking in conjunction with algorithms other than page rank algorithms. For example, the ranking system may be adapted to be used in conjunction with HITS- and DirectHit-based algorithms. The ranking system may also be used to rank vertices of a directed graph regardless of what the vertices and links represent. As described above, the vertices and links may represent web pages and their hyperlinks, scholarly articles and their citations, authors of scholarly articles and authors of their citations, and so on. In general, the ranking system attempts to rank the vertices of a directed graph by modifying the rankings indicated by the links as little as possible to satisfy the prior knowledge of the ranking. The ranking system may effect this minimal modification of the rankings indicated by the links by a minimal perturbation of the transition-probability matrix. Accordingly, the invention is not limited except as by the appended claims.

The invention claimed is:

1. A computing device for ranking of vertices of a directed graph, the computing device comprising:
a processor;
an indication of links between the vertices of the directed graph;
prior knowledge relating to ranking of the vertices of the directed graph; and
a component that generates a ranking of the vertices based on the links between the vertices consistent with the prior knowledge relating to ranking of the vertices the component being implemented as computer-executable instructions stored in memory of the computing device for execution by the processor
wherein the ranking is based on solving the following objective functions and constraints:

$$\pi(E) = \arg \min_{\pi} \|E\|_F^2 + c\pi^T (I + E - P)(I + E - P)^T \pi$$

s.t. $e^T \pi = 1$ $\pi \geq 0$ $A\pi > B\pi$ and $$E(\pi) = \arg \min_{E} \|E\|_F^2 + c\pi^T (I + E - P)(I + E - P)^T \pi$$

s.t. $(P-E)e = e$ $(P-E) \geq 0$.

2. The computing device of claim 1 wherein the vertices represent documents and including a component that displays an indication of the new ranking of the documents.

3. The computing device of claim 1 wherein the vertices represent documents and including a component that determines an ordering of documents relating to a query based on the generated new ranking.

4. The computing device of claim 1 wherein the vertices represent documents and the prior ranking is a partial ranking of the documents.

5. The computing device of claim 1 wherein the indication of the links is an adjacency matrix.

6. The computing device of claim 1 wherein the component generates the new ranking based on minimizing perturbation of a transition-probability matrix derived from the links between the vertices.

7. The computing device of claim 6 wherein the component that generates the new ranking applies an interactive optimization to iteratively generate a new ranking based on a fixed perturbation and generate a perturbation based on a fixed ranking until the new ranking and perturbation converge on a solution.

8. The computing device of claim 7 wherein only elements of the transition-probability matrix that correspond to links are perturbed.

9. A computer-readable storage medium embedded with computer-executable instructions for controlling a computer system to rank web pages, by a method comprising:
providing an adjacency matrix indicating links between the web pages;
providing a partial ranking of the web pages;
generating a transition-probability matrix based on the links of the web pages, the transition-probability matrix indicating probability of transitioning from one web page to another web page; and
generating a stationary distribution for the transition-probability matrix that attempts to satisfy the partial ranking of the web pages and minimizes perturbation of the transition probability matrix, the stationary distribution representing the ranking of the web pages
wherein the generating of the stationary distribution applies an interior-point optimization technique.

10. The computer-readable storage medium of claim 9 wherein the information collected from a user includes a relative ranking of some web pages.

11. The computer-readable storage medium of claim 9 wherein the generating of the stationary distribution is performed based on a non-convex problem space being converted to a convex problem space.

12. The computer-readable storage medium of claim 9 including displaying an indication of the new ranking of the web pages.

13. The computer-readable storage medium of claim 9 including determining an ordering of the web pages as results of a query based on the generated new ranking.

14. The computer-readable storage medium of claim 9 wherein the information collected from a user is click-through data indicating access to the web pages by the user.

15. A computer-readable storage medium embedded with computer-executable instructions for controlling a computer system to rank web pages, by a method comprising:
providing an adjacency matrix indicating links between the web pages;
providing a partial ranking of the web pages;
generating a transition-probability matrix based on the links of the web pages, the transition-probability matrix indicating probability of transitioning from one web page to another web page; and generating a stationary distribution for the transition-probability matrix that attempts to satisfy the partial ranking of the web pages and minimizes perturbation of the transition probability matrix, the stationary distribution representing the ranking of the web pages wherein the generating of the stationary distribution applies an interactive optimization to iteratively generate a stationary distribution based on a fixed perturbation to the transition-probability matrix and generate a perturbation to the transition-probability matrix based on a fixed stationary distribution until the stationary distribution and perturbation converge on a solution and wherein the stationary distribution is based on solving the following objective functions and constraints:

$$\pi(E) = \arg \min_{\pi} \|E\|_F^2 + c\pi^T(I + E - P)(I + E - P)^T\pi$$

s.t. $e^T\pi = 1$ $\pi \geq 0$ $A\pi > B\pi$ and $$E(\pi) = \arg \min_{E} \|E\|_F^2 + c\pi^T(I + E - P)(I + E - P)^T\pi$$

s.t. $(P-E)e = e$ $(P-E) \geq 0$.

16. The computer-readable storage medium of claim 15 wherein only elements of the transition-probability matrix that correspond to links are perturbed.

17. A method in a computer system for ranking documents, the method comprising:

providing an adjacency matrix indicating links between the documents;

providing a partial ordering of the documents indicating relative ranking of some documents;

generating by the computer system a transition-probability matrix from the adjacency matrix that indicates probability of transitioning from one document to another document; and generating by the computer system a stationary distribution for the transition-probability matrix that attempts to minimize perturbation to the transition-probability matrix needed to satisfy the partial ordering, the stationary distribution representing a new ranking of the documents that is based on both the partial ordering of the document and probability of transitioning from one document to another document wherein the generating of the stationary distribution applies an interior-point optimization technique.

18. The method of claim 17 wherein the generating of the stationary distribution applies an interactive optimization to iteratively generate a stationary distribution based on a fixed perturbation and generate a perturbation based on a fixed stationary distribution until the stationary distribution and perturbation converge on a solution.

* * * * *